United States Patent [19]
Haines et al.

[11] Patent Number: 5,824,973
[45] Date of Patent: *Oct. 20, 1998

[54] METHOD OF MAKING SOUND ABSORBING LAMINATES AND LAMINATES HAVING MAXIMIZED SOUND ABSORBING CHARACTERISTICS

[75] Inventors: James Charles Haines, Littleton; Ralph Michael Fay, Lakewood, both of Colo.

[73] Assignee: Johns Manville International, Inc., Denver, Colo.

[ * ] Notice: The term of this patent shall not extend beyond the expiration date of Pat. No. 5,459,291.

[21] Appl. No.: 543,766

[22] Filed: Oct. 16, 1995

Related U.S. Application Data

[63] Continuation-in-part of Ser. No. 224,600, Apr. 7, 1994, Pat. No. 5,459,291, which is a continuation-in-part of Ser. No. 953,415, Sep. 29, 1992, abandoned.

[51] Int. Cl.⁶ ...................................................... E04B 1/82
[52] U.S. Cl. .......................... 181/286; 181/291; 181/294
[58] Field of Search ..................................... 181/286, 290, 181/291, 292, 293, 294; 428/190

[56] References Cited

U.S. PATENT DOCUMENTS

| | | | |
|---|---|---|---|
| 3,542,638 | 11/1970 | Kenny | 181/290 |
| 3,977,492 | 8/1976 | Hankel . | |
| 4,283,457 | 8/1981 | Kolsky et al. | 181/290 X |
| 4,851,283 | 7/1989 | Holtrop et al. | 181/290 X |

FOREIGN PATENT DOCUMENTS

| | | |
|---|---|---|
| 2265147 | 10/1975 | France . |
| 2329613 | 5/1977 | France . |
| 9213339 | 8/1992 | WIPO . |

OTHER PUBLICATIONS

Noise Con 97; The Pennsylvania State University; Heng–Yi Lai and J. Stuart Bolton; Jun. 15–17, 1997.
"Layered Fibrous Treatments for Sound Absorption and Sound Transmission"; pp. 9–14.

*Primary Examiner*—Khanh Dang
*Attorney, Agent, or Firm*—Robert D. Touslee

[57] ABSTRACT

A sound absorption laminate comprises a porous insulation substrate, such as, a glass, polymeric or natural fiber blanket or a foamed polymeric resin sheet and a facing sheet with a high air flow resistance. The facing sheet is superimposed upon a surface of the porous insulation substrate to augment the acoustical properties of the substrate. With the facing sheet the air flow resistance of the laminate is greater than the air flow resistance of the substrate and the laminate exhibits a higher sound absorption coefficient than the sound absorption coefficient of the substrate. Thus, the laminate exhibits better sound absorption properties than the substrate and is suitable for sound absorption applications for which the substrate alone would not be suitable.

15 Claims, 4 Drawing Sheets

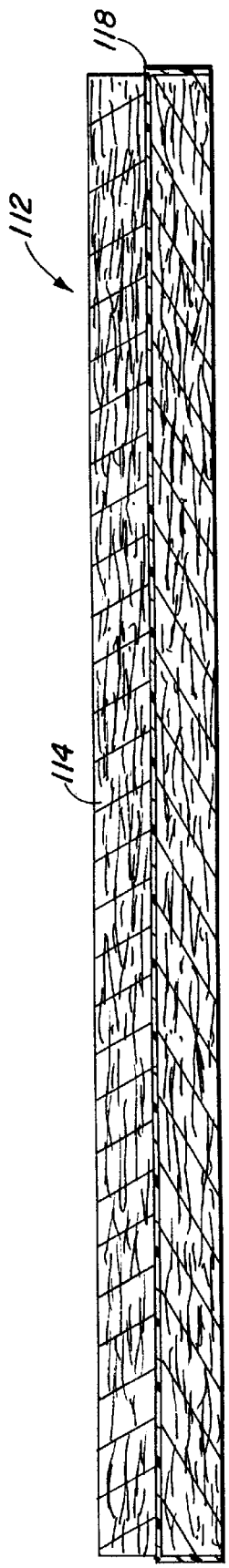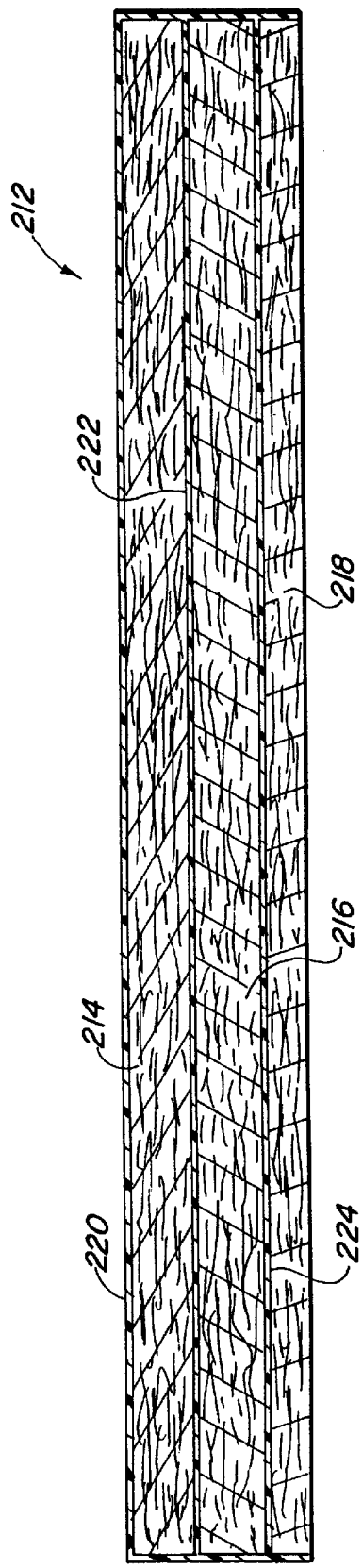

METHOD OF MAKING SOUND ABSORBING LAMINATES AND LAMINATES HAVING MAXIMIZED SOUND ABSORBING CHARACTERISTICS

This is a continuation-in-part of application Ser. No. 08/224,600 filed Apr. 7, 1994, now U.S. Pat. No. 5,459,291 which is a continuation-in-part of application Ser. No. 07/953,415 filed Sep. 29, 1992, now abandoned.

BACKGROUND OF THE INVENTION

The present invention relates to the use of facings, having high air flow resistances, to enhance the sound absorption properties of certain porous insulation materials and especially, those insulation materials having low air flow resistances. By laminating the high air flow resistance facings to these particular porous insulation materials, these porous insulation materials exhibit sound absorption characteristics normally provided by more costly fibrous insulation materials of greater thickness, higher bulk density and/or smaller average fiber diameter and foam insulation materials having smaller cells and pores.

Porous insulation materials such as thermoplastic glass or polymeric fiber blankets and polymeric foams are used in many applications to enhance the sound absorption performance of various products and systems. Typical applications include: acoustical wall panels, ceiling panels and office partitions; automotive headliners and hoodliners; liners for heating, ventilating and air conditioning systems; appliance insulation; and similar applications.

The sound absorption characteristics of these porous insulation materials is a function of the acoustic impedance of the material. The acoustic impedance is a complex quantity consisting of frequency dependent components called, respectively, acoustic resistance and acoustic reactance. The acoustic reactance of these porous insulation materials is governed largely by the thickness of the product and, to a much lesser extent, by the mass per unit area of an air permeable facing or film which may be applied over the surface of the porous insulation material. The acoustic resistance of the porous insulation material is governed by the air flow resistance of the porous insulation material.

The ratios of the acoustic reactance and the acoustic resistance to the characteristic impedance of air determines the normal incidence sound absorption coefficient. For a given value of the acoustic reactance ratio, there is an optimum value of the acoustic resistance ratio which will provide the maximum sound absorption. Since the reactance ratio of a porous insulation material is determined largely by the thickness of the porous insulation material, the most effective way of controlling the sound absorption properties of a porous insulation material is by adjusting the acoustic resistance ratio. In the past, the acoustic resistance ratio has been adjusted by changing the physical properties of the porous insulation materials. In fibrous insulations, such as glass fiber insulations, the average fiber diameter of the insulation has been decreased, the bulk density of the insulation has been increased, and the binder content of the insulation has been increased. In polymeric resin foam insulations, the average pore or cell size of the insulation material has been decreased. While these physical modifications increase the acoustic resistance ratio of these insulation product, the cost of producing these products is also increased.

SUMMARY OF THE INVENTION

The present invention uses a thin, coated or uncoated, semi-porous paper, fabric or perforated film facing of controlled air flow resistance to increase the air flow resistance of an underlying porous insulation, such as, a glass or polymeric fiber insulation or a polymeric foam insulation, having an acoustic resistance ratio less than the optimum acoustic resistance ratio for optimum sound absorption. The acoustic reactance ratio of the laminate formed by applying the facing to the porous insulation substrate is not materially different from the acoustic reactance ratio of the porous insulation substrate. However, the increased air flow resistance of the laminate (formed by applying the facing to the porous insulation substrate) relative to the air flow resistance of the porous insulation substrate, results in an acoustic resistance ratio for the laminate which is greater than the acoustic resistance ratio of the porous insulation substrate. Accordingly, the sound absorption properties of the laminate are superior to those of the porous insulation substrate.

The benefits of the present invention are most dramatic when such facings are applied to low cost, thin, lightweight fibrous insulations made with large diameter fibers and thin, lightweight, polymeric foam insulations having large cells and pores. The air flow resistance provided by such insulations is frequently too low to provide adequate sound absorption for many applications. By increasing the air flow resistance of these low cost porous insulation materials through the use of controlled air flow resistance facings, the sound absorbing properties of these porous insulation materials are improved so that these low cost insulations can be used for more demanding applications previously requiring the use of more expensive insulation materials.

However, the greater the thickness and/or bulk density of a porous insulation material, the greater the air flow resistance of the material. For porous insulation materials of a certain thickness and/or density, the air flow resistance of the porous insulation material, alone, provides the insulation with an acoustic resistance ratio at or above the optimum acoustic resistance ratio for optimum sound absorption. For these porous insulation materials, increasing the air flow resistance, by applying a facing to the porous insulation material will only degrade the sound absorption properties of the insulation material. Thus, the present invention is directed to the use of thin, coated or uncoated, semi-porous, facings, only, on those porous insulation materials where the air flow resistance of the facing, when combined with the air flow resistance of the porous insulation material, forms a faced porous insulation laminate with superior sound absorption properties to those of the porous insulation.

BRIEF DESCRIPTION OF THE DRAWINGS

FIG. 4 is a cross section of a sound absorbing laminate of the present invention comprising a thin, semi-porous facing sheet intermediate two porous insulation substrates.

FIG. 5 is a cross section of a sound absorbing laminate of the present invention wherein the laminate comprises a plurality of porous insulation substrates and both inner and outer thin, semi-porous facing sheets.

DESCRIPTION OF THE PREFERRED EMBODIMENTS

Figure 1:
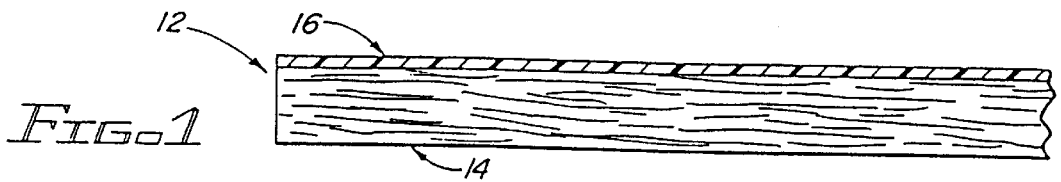
FIG. 1 is a cross sectional view of a sound absorbing laminate of the present invention comprising a thin, semi-porous facing sheet and a porous insulation substrate.
Figure 2A:
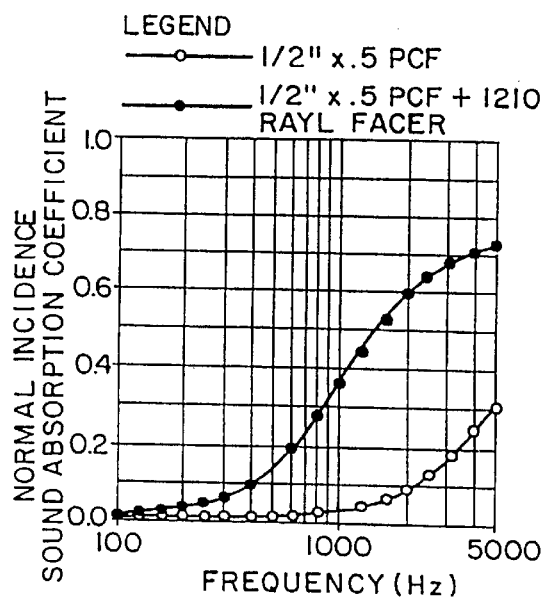
FIGS. 2.1 to 2.6 show the calculated normal incidence sound absorption coefficients for nominally one half inch thick glass fiber insulation, at progressively higher bulk densities ranging from 0.5 to 6.0 pounds per cubic foot, with and without an optimum air flow resistance facing applied to the insulation.
Figure 2B:
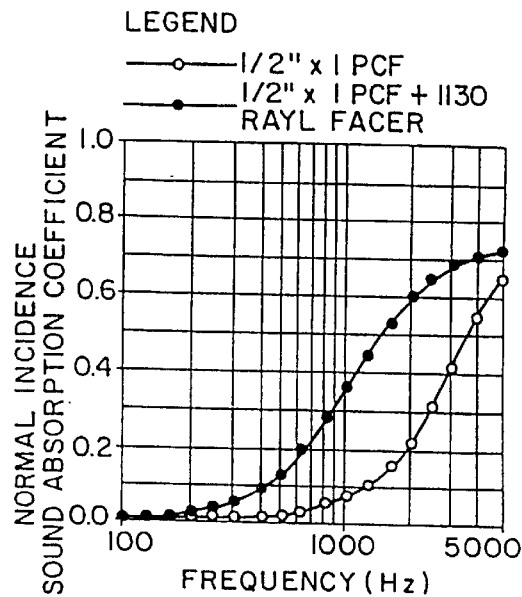
Figure 2C:
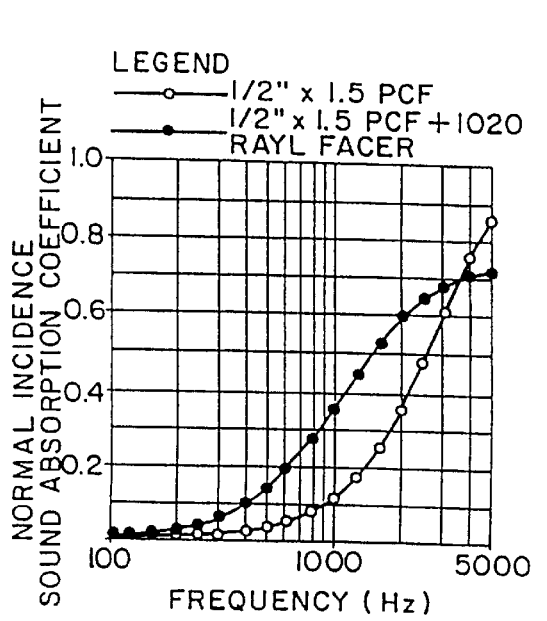
Figure 2D:
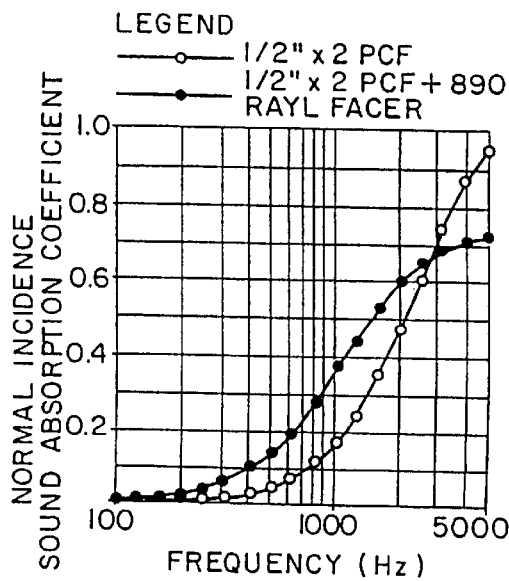
Figure 2E:
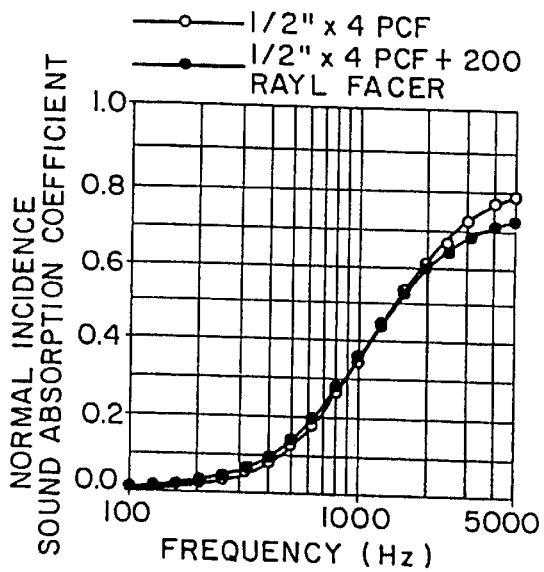
Figure 2F:
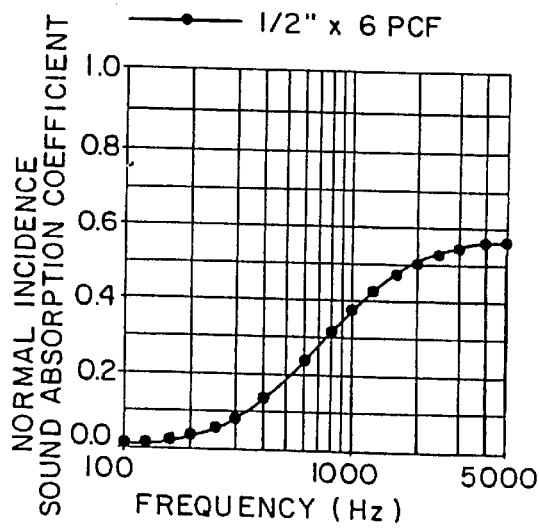
Figure 3A:
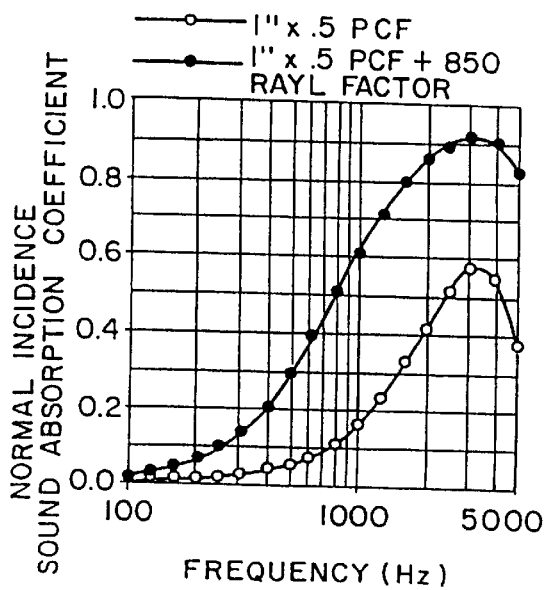
FIGS. 3.1 to 3.6 show the calculated normal incidence sound absorption coefficients for nominally one inch thick glass fiber insulation, at progressively higher bulk densities ranging from 0.5 to 6.0 pounds per cubic foot, with and without an optimum air flow resistance facing applied to the insulation.
Figure 3B:
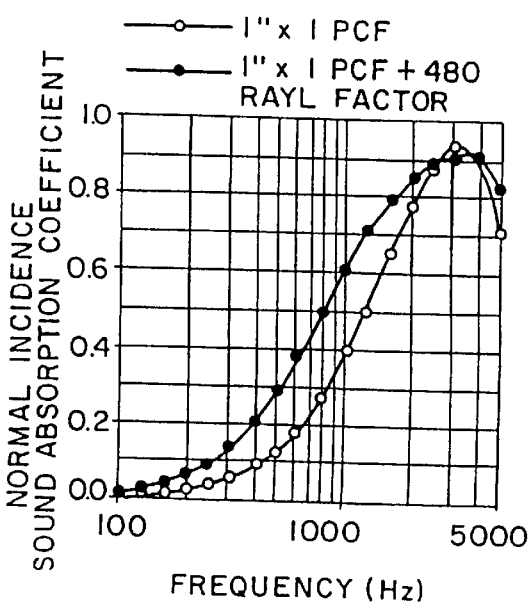
Figure 3C:
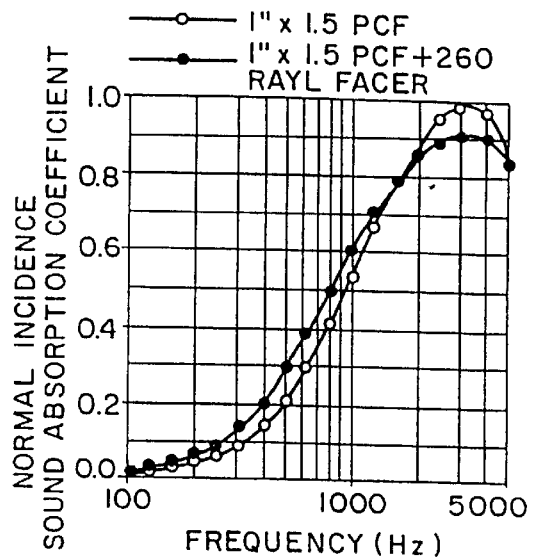
Figure 3D:
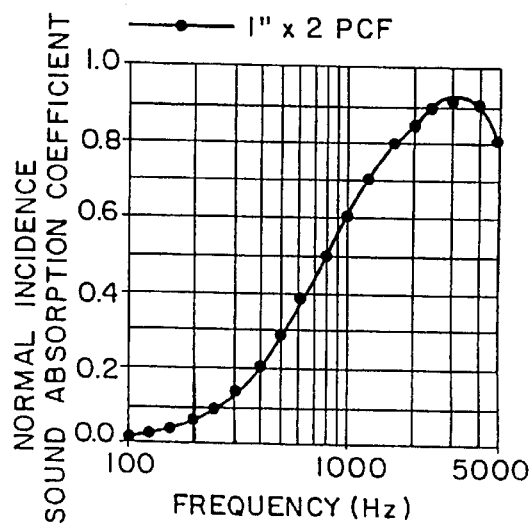
Figure 3E:
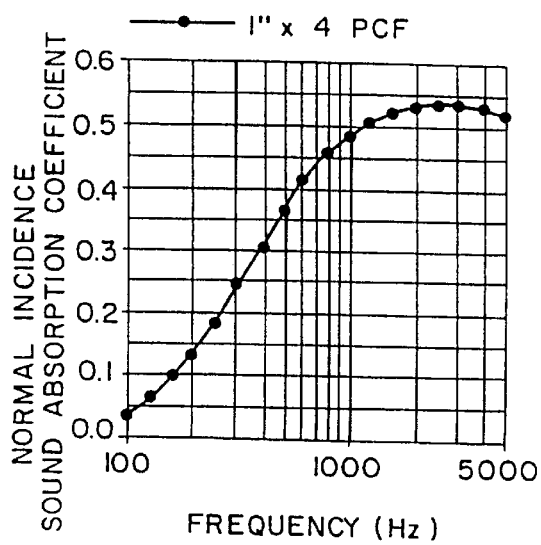
Figure 3F:
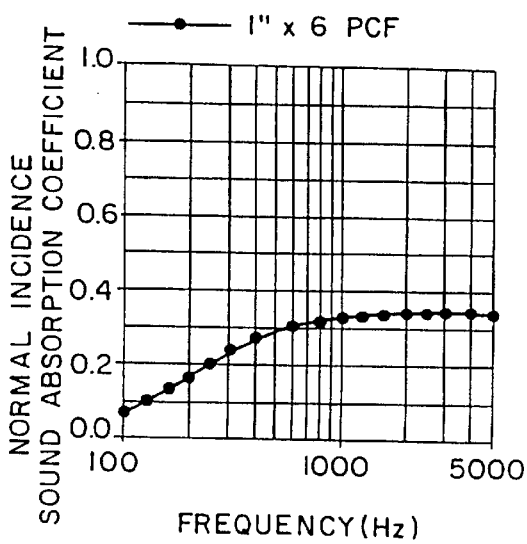

FIG. 1 illustrates a sound absorption laminate 12 comprising a porous insulation substrate 14 and a controlled porosity facing 16 superimposed upon one surface of the porous insulation substrate. A preferred means of maintaining the facing 16 in place on the substrate 14 is to adhere the facing to the major surface of the porous insulation substrate 14, e.g. by adhesive bonding or thermal bonding. However, the facing 16 may be secured to or maintained in place on the surface of the porous insulation a substrate by other means, including but not limited to, mechanical fasteners adhering, bonding or otherwise securing the facing to the substrate along the edges or sides of the substrate or by otherwise directly or indirectly securing the facing to the substrate. While the porous insulation substrate 14 can be a relatively high density substrate, the porous insulation substrate 14 is typically a low cost, thin, lightweight, large diameter fiber, fibrous insulation material, such as, a glass fiber, thermoplastic polymeric fiber, thermosetting polymeric fiber, carbonaceous fiber, carbonized fiber, graphitized fiber insulation or a cotton fiber, milkweed fiber or other natural fiber insulation having a bulk density of less than two pounds per cubic foot, or a low cost, thin, lightweight foam insulation material, such as a polymeric foam, having large cells and pores. These substrates typically are less than three inches in thickness. The controlled porosity facing 16 is a thin, coated or uncoated, semi-porous paper, fabric or perforated film facing having a controlled air flow resistance which is selected to add to the air flow resistance of the underlying substrate 14 whereby the sound absorption properties of the laminate 12 are improved over the sound absorption properties of the substrate 14, alone. The appropriate facing for a particular substrate 14 is selected as follows.

The sound absorption performance of the porous insulation substrate 14 is a function of the acoustic impedance of the substrate 14. The sound absorption performance of the sound absorption laminate 12 is a function of the acoustic impedance of the laminate 12. The acoustic impedance of the porous insulation substrate 14 is a function of the acoustic resistance and the acoustic reactance of the substrate. The acoustic impedance of the sound absorption laminate 12 is a function of the acoustic resistance and the acoustic reactance of the laminate. The acoustic reactance of the porous insulation substrate 14 or the sound absorption laminate 12 is governed largely by the thickness of the substrate or the laminate. The acoustic resistance of the porous insulation substrate 14 or the sound absorption laminate 12 is governed largely by the air flow resistance of the substrate or the laminate. The ratios of the acoustic reactance and the acoustic resistance to the characteristic impedance of air, c, for the porous insulation substrate 14 or the laminate 12 determine the sound absorption characteristics of the substrate or the laminate. The angle of incidence of sound waves with respect to the surface of the porous insulation substrate 14 or the sound absorption laminate 12 also affects the degree of sound absorption achieved by the substrate or the laminate. For the purposes of illustration, the following discussion deals only with the normal (90° angle of incidence) sound absorption properties of a porous insulation substrate or a laminate. However, the concept of enhancing the sound absorption characteristics of a porous insulation substrate, through the application of a high air flow resistance facing to the substrate, applies to products intended to absorb sound in both normal incidence and/or diffuse (random incidence) sound fields. The following calculations of the normal incidence acoustical properties or characteristics of porous insulation substrates 14 and laminates 12, as well as, the procedures for estimating the desired air flow resistance characteristics of the high air flow resistance facing to be applied to the substrate are intended to be used only as a first approximation.

Once the value of the optimum air flow resistance for a facing to be applied to a given porous insulation substrate has been estimated, the actual value of the optimum air flow resistance for a facing to be applied to a given porous insulation substrate, to maximize the sound absorption properties of the laminate formed by applying the facing to the substrate, is best determined experimentally using a range of various air flow resistance facings over the particular substrate. Optimizing such a sound absorption laminate system for normal incidence sound absorption properties can be accomplished by using either the standing-wave or the two-microphone impedance tube methods described in ASTM methods C-384 and E-1050, respectively. Optimizing the random incidence sound absorption of a particular sound absorption laminate system can be accomplished experimentally by using the reverberation room test method described in ASTM method C-423.

For normally incident sound, the sound absorption of a substrate or sound absorption laminate may be estimated from the following relationship:

$$\alpha_n = (4r/\rho c)/[(r/\rho c+1)^2 + (x/\rho c)^2] \qquad \text{Eq. 1}$$

here:

$\alpha_n$=normal incidence sound absorption coefficient r/$\rho$c=acoustic resistance ratio x/$\rho$c=acoustic reactance ratio $\rho$c=characteristic impedance of air (approximately 406 mks rayls)

Thus, as shown by Equation 1, for a given value of the acoustic reactance ratio (x/$\rho$c) which is governed mainly by the thickness of the porous insulation substrate 14 or sound absorption laminate 12, there is an optimum value of the acoustic resistance ratio (r/$\rho$c) which will provide the largest normal incidence sound absorption coefficient for the porous insulation substrate or the sound absorption laminate 12. Where the fibrous insulation substrate 14, due to its thickness, bulk density and/or fiber diameters, or the polymeric foam insulation substrate 14, due to its thickness and/or pore and cell size, already has a sufficient air flow resistance to optimize the value of the acoustic resistance ratio, the lamination of a thin, semi-porous facing to the substrate will not enhance the sound absorption characteristics of the substrate and the facing should not be applied for acoustical purposes. However, where the porous insulation substrate does not have the required air flow resistance to optimize the value of the acoustic resistance ratio for the particular substrate, a thin, semi-porous facing laminated to the substrate can increase the air flow resistance of the substrate to optimize the value of the acoustic resistance ratio and thereby optimize the sound absorption coefficient.

To determine whether or not a facing can be laminated to a porous insulation substrate 14 to improve the acoustical performance of the substrate, the acoustic resistance ratio of the unfaced substrate, the acoustic reactance ratio of the unfaced substrate and the optimum acoustic resistance ratio for the substrate should be calculated. If the value of the acoustic resistance ratio of the unfaced substrate is already sufficient to maximize the sound absorption properties of the substrate, there is no need to apply a facing to the substrate for acoustical purposes. If the value of the acoustic resistance ratio of the porous insulation substrate is insufficient to maximize the sound absorption properties of the substrate, the additional air flow resistance to be provided by a facing to achieve the optimum acoustic resistance ratio is determined and the appropriate facing is selected.

Equations 2, 3, and 4, below, can be used to determine the acoustic resistance ratios and the acoustic reactance ratios for the porous insulation substrate 14 and the sound absorption laminate 12. These equations enable one to determine whether or not a facing can enhance the acoustical performance of a porous insulation substrate and, if the acoustical performance can be enhanced, the additional air flow resistance required from a facing to optimize the acoustic resistance ratio.

For plain glass fiber insulations without a facing, the acoustic resistance of the substrate ($r_s$) may be either measured directly by ASTM method C-522 or estimated on the basis of the following empirical relationship:

$$r_s = 3180(\rho_s^{1.43}/d^2)t \qquad \text{Eq. 2}$$

where:

$r_s$ = the air flow resistance of the substrate in mks rayls
$\rho_s$ = the glass fiber insulation bulk density in kg/m$^3$
d = the glass fiber mean diameter in microns
t = the thickness of the glass fiber insulation in meters The acoustic resistance ratio of a laminate of the glass fiber insulation, with a facing applied, is calculated as follows. The acoustic resistance ($r_s$) of the glass fiber insulation substrate is either measured or computed as in Equation 2, above. The additional acoustic resistance provided by the facing ($r_f$) is added to the acoustic resistance of the glass fiber insulation substrate to obtain the acoustic resistance of the sound absorption laminate. This sum is then divided by the characteristic impedance of air ($\rho c$) to obtain the acoustic resistance ratio ($r_L/\rho c$) of the sound absorption laminate as follows:

$$r_L/\rho c = (r_s + r_f)/\rho c \qquad \text{Eq. 3}$$

where $r_L/\rho c$ = the acoustic resistance ratio of the glass fiber insulation substrate plus the facing, dimensionless
$r_f$ = the acoustic resistance of the facing in mks rayls
$r_s$ = the acoustic resistance of the glass fiber insulation substrate in mks rayls The acoustic reactance ratio ($x/\rho c$) used in the calculation of the normal incidence sound absorption coefficient can be approximated by the following expression:

$$x/c = -1 [1/\tan (2\pi fL/c)] \qquad \text{Eq. 4}$$

where $x/\rho c$ = the acoustic reactance ratio, dimensionless
$\pi$ = 3.14159
f = frequency, Hz.
L = the distance from the surface of the outer face of the glass fiber insulation substrate to a reflective backing behind the substrate, such as a rigid wall, in meters
c = the speed of sound in meters per second At a given frequency, the optimum acoustic resistance ratio for a sound absorption laminate, $r_L/\rho c$, will be approximately equal to the following expression:

$$r_L/\rho c = [(1+(x/\rho c)^2]^{0.5} \qquad \text{Eq. 5}$$

In order to determine whether or not the addition of a high flow resistance facing will improve the normal incidence sound absorption provided by a particular porous insulation substrate at a given frequency, the acoustic resistance ratio ($r_s/\rho c$) of the substrate is measured (ASTM C-522) or computed (Eq. 2) and the acoustic reactance ratio ($x/\rho c$) is computed (Eq. 4). If the magnitude of the acoustic resistance ratio ($r_s/\rho c$) of the porous insulation substrate is numerically less than the optimum value computed from Equation 5, the application of a high flow resistance facing to the porous insulation substrate will likely improve the normal incidence sound absorption of the substrate. If the magnitude of the acoustic resistance ratio of the porous insulation substrate is numerically equal to or larger than the optimum value computed from Equation 5, the application of a high flow resistance facing to the substrate will likely reduce the normal incidence sound absorption provided by the substrate alone.

This procedure can be repeated over a range of frequencies in order to determine whether or not a high air flow resistance facing will be beneficial and, if so, approximately what value of flow resistance is required for the facing.

The desired value of acoustic resistance ratio for the facing material to be applied over a particular substrate will then be the difference between the acoustic resistance ratio of the porous insulation substrate and the optimized value of the acoustic resistance ratio for the substrate. Thus, the acoustical properties of thin, low density, porous insulation materials can be upgraded through the use of the appropriate thin, coated or uncoated, semi-porous paper, fabric or perforated film facing.

FIGS. 2.1 to 2.6 and 3.1 to 3.6 illustrate how the use of a thin, semi-porous facing can enhance the sound absorption characteristics of thin, low density, porous glass fiber insulation materials. FIGS. 2.1 to 2.6 show the calculated normal incidence sound absorption coefficients for frequencies from 100 to 5,000 Hz. for one-half inch nominal thickness faced and unfaced glass fiber insulation, comprising fibers having a mean fiber diameter of 4.7 microns, at bulk densities of 0.5, 1.0, 1.5, 2.0, 4.0 and 6.0 pounds per cubic foot. FIGS. 3.1 to 3.6 show the calculated normal incidence sound absorption coefficients for frequencies from 100 to 5,000 Hz. for one inch nominal thickness faced and unfaced glass fiber insulation, comprising fibers having a mean fiber diameter of 4.7 microns, at bulk densities of 0.5, 1.0, 1.5, 2.0, 4.0 and 6.0 pounds per cubic foot. As illustrated in FIGS. 2.1 to 2.6, a facing can greatly enhance the sound absorption characteristics for one-half inch thick glass fiber insulation for densities up to approximately 4.0 pounds per cubic foot. Above a density of 4.0 pounds per cubic foot, the flow resistance of the porous insulation has already reached the optimum value and a facing does not augment the acoustical properties of the glass fiber insulation. As shown in FIGS. 3.1 to 3.6, a facing can greatly enhance the sound absorption characteristics for one inch thick glass fiber insulation for densities up to approximately 1.5 pounds per cubic foot. Above a density of 1.5 pounds per cubic foot, the flow resistance of the porous insulation has already reached the optimum value and a facing does not augment the acoustical properties of the glass fiber insulation. Thus, FIGS. 2.1 to 2.6 and 3.1 to 3.6 illustrate that the present invention, through the use of relatively inexpensive, thin, semi-porous facings can upgrade the performance of particular inexpensive, porous insulations whereby such inexpensive insulations can be used for more demanding applications previously requiring the use of more expensive insulation materials.

In FIGS. 2.1 to 2.6 and 3.1 to 3.6, the optimum acoustic resistance value for a particular insulation of a given thickness and bulk density was calculated by iteratively computing the normal incidence sound absorption coefficient for that thickness and density as a function of $r_f$. The value of $r_f$ which provided the highest average normal incidence sound absorption coefficient for the frequencies of 250, 500, 1,000 and 2,000 Hz. was taken as the optimum air flow resistance value for the facing. The frequencies of 250, 500, 1,000 and 2,000 Hz were selected for determining the optimum air flow resistance for the facing because sound absorptive materials are normally specified on the basis of the single number Noise Reduction Coefficient (NRC). The NRC is computed on the basis of the average random incidence sound absorption at those four frequencies. It is assumed that the random incidence sound absorption coefficients will rank in order with the normal sound incidence coefficients as computed for FIGS. 2.1 to 2.6 and 3.1 to 3.6.

This assumption was verified using Manville one-half inch nominal thickness, 1.5 pound per cubic foot, EXACT-O-COTE glass fiber insulation with and without a high air flow resistance SNOWWEB fibrous fabric facing imbedded in an acrylic coating applied to one side of the glass fiber insulation. With the use of the SNOWWEB facing, the air flow resistance of the sound absorption laminate was approximately 740 mks rayls while the air flow resistance of the glass fiber insulation, alone, was only approximately 360 mks rayls. The average normal incidence sound absorption coefficient for the frequencies of 250, 500, 1,000 and 2,000 Hz. was increased from 0.29 to 0.37 and the random incidence noise reduction coefficient (NRC) was increased from 0.55 to 0.60 even though the flow resistance for the laminate was below the theoretical optimum value of approximately 1,250 mks rayls. To applicants' knowledge, a 0.60 NRC value was not previously possible to attain in an one-half inch thick glass fiber insulation product at a bulk density of approximately 1.5 pounds per cubic foot.

FIG. 4 shows a sound absorption laminate 112 of the present invention comprising porous insulation substrates 114 and 116 and a controlled porosity facing 118 intermediate major surfaces of the porous insulation substrates 114 and 116. Like the porous insulation substrate 14 of FIG. 1, the porous insulation substrates 114 and 116 are typically a low cost, thin, lightweight, large diameter fiber, fibrous insulation material, such as, a glass fiber, thermoplastic polymeric fiber, thermosetting polymeric fiber, carbonaceous fiber, carbonized fiber, graphitized fiber insulation or a cotton fiber, milkweed fiber or other natural fiber insulation having a bulk density of less than two pounds per cubic foot, or a low cost, thin, lightweight foam insulation material having large cells or pores, such as a polymeric foam insulation. Like the controlled porosity facing 16, the controlled porosity facing 118 is a thin, coated or uncoated, semi-porous paper, fabric, or perforated film facing having a controlled air flow resistance which is selected to add to the air flow resistance of one or both of the substrates 114 and 116 whereby the sound absorption properties of the laminate 112 is improved over the sound absorption properties of the substrates 114 and 116 alone. The appropriate facing 118 for either substrate 114 or 116 or both substrates 114 and 116, considered together, is selected the same way the facing 16 is selected for the substrate 14 to form the laminate 12 of FIG. 1.

A preferred means of maintaining the facing 118 in place, as an inner facing or septum, between the substrates of the laminate 112 is to adhere the facing 118 to the major surfaces of the porous insulation substrates 114 and 116, e.g. by adhesive or thermal bonding. However, the facing 118 may be secured to or maintained in place between the major surfaces of the porous insulation substrates 114 and 116 by other means, including but not limited to, mechanical fasteners, adhering or otherwise securing the facing 118 to the substrates along the edges or sides of the substrates or by otherwise directly or indirectly securing the facing to or maintaining the facing in place between the substrates.

FIG. 5 shows a sound absorption laminate 212 of the present invention comprising multiple layers of substrates 214, 216 and 218 and controlled porosity facings 220, 222 and 224. Facing 220 is superimposed upon substrate 214 and facings 216 and 218 are intermediate substrates 220–222 and 222–224, respectively.

Like the porous insulation substrate 14 of FIG. 1, the porous insulation substrates 214, 216 and 218 are typically a low cost, thin, lightweight, large diameter fiber, fibrous insulation material, such as, a glass fiber, thermoplastic polymeric fiber, thermosetting polymeric fiber, carbonaceous fiber, carbonized fiber, graphitized fiber insulation or a cotton fiber, milkweed fiber or other natural fiber insulation having a bulk density of less than two pounds per cubic foot, or a low cost, thin, lightweight foam insulation material having large cells or pores, such as, a polymeric foam insulation. Like the controlled porosity facing 16 of FIG. 1, the controlled porosity facings 220, 222 and 224 are thin, coated or uncoated, semi-porous paper, fabric or perforated film facings having controlled air flow resistances which are selected to add to the air flow resistance of an associated substrate or substrates whereby the sound absorption properties of the laminate 212 (including one or more layered portions, e.g. facing 220 and substrate 214; facing 222 and substrate 216; or facing 224 and substrate 218 of the laminate) are improved over the sound absorption properties of the substrates 214, 216 and 218 alone. Thus, in a preferred embodiment of the laminate of FIG. 5, the air flow resistances of the substrates and the facings can be selected so that the laminate 212, as a whole, has an acoustic resistance ratio that is maximized around the optimized acoustic resistance ratio of the substrates or the facings can together can have an acoustic resistance ratio that is about equal to the difference between the acoustic resistance ratio of the substrates and the optimized value of the acoustic resistance ratio for the substrates. The appropriate facings for the substrates of the laminate 212 are selected the same way the facing 16 is selected for the substrate 14 to form the laminate 12 of FIG. 1.

A preferred means of maintaining the facing 220 in place upon substrate 214 and facings 222 and 224 in place as inner facings or septums, between substrates 214–216 and 216–218, respectively, is to adhere the facings to the major surfaces of the porous insulation substrates e.g. by adhesive or thermal bonding.

However, the facings 220, 222 and 224 may be secured to or maintained in place upon and between the major surfaces of the substrates 214, 216 and 218 by other means, including but not limited to, mechanical fasteners, adhering or otherwise securing the facing to the substrates along the edges or sides of the substrates or otherwise directly or indirectly securing the facing to or maintaining the facings in place upon or between the substrates.

In describing the invention certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a sound absorbing laminate comprising:
   a) selecting a porous insulation substrate having low air flow resistance;
   b) determining the optimized value of the acoustic resistance ratio for said substrate;
   c) selecting a thin, semi-porous facing having an acoustic resistance ratio such that when superimposed upon a face of said substrate, a laminate is formed having an acoustic resistance ratio greater than the acoustic resistance ratio of said substrate and no greater than the optimized value of the acoustic resistance ratio for said substrate; and
   d) superimposing said facing on said substrate to form a laminate having good sound absorbing characteristics.

2. The method of claim 1, including: adhering said facing to said face of said substrate.

3. The method of claim 1, wherein: said substrate is comprised of a material selected from the group of glass fibers, thermoplastic polymeric fibers, thermosetting polymeric fibers, cotton fibers, milkweed fibers, carbonaceous fibers, carbonized fibers, graphitized fibers and a polymeric foam.

4. The method of claim 1, wherein: said facing selected has an acoustic resistance ratio that when superimposed upon said face of said substrate, a laminate is formed having an acoustic resistance ratio that is approximates or equals the optimized value of the acoustic resistance ratio for said substrate.

5. The method of claim 4, wherein: said substrate is comprised of a material selected from the group of glass fibers, thermoplastic polymeric fibers, thermosetting polymeric fibers, cotton fibers, milkweed fibers, carbonaceous fibers, carbonized fibers, graphitized fibers, and a polymeric foam.

6. The method of claim 1, wherein: said facing selected has an acoustic resistance ratio that approximates or equals the difference between the acoustic resistance ratio of said substrate and the optimized value of the acoustic resistance ratio for said substrate.

7. The method of claim 6, wherein: said substrate is comprised of a material selected from the group of glass fibers, thermoplastic polymeric fibers, thermosetting polymeric fibers, cotton fibers, milkweed fibers, carbonaceous fibers, carbonized fibers, graphitized fibers, and a polymeric foam.

8. A laminate having maximized sound absorbing characteristics, comprising:
   a) a porous insulation substrate having an air flow resistance less than that required to produce an optimum sound absorbing characteristic for said substrate; and
   b) a thin, semi-porous facing superimposed upon a face of said substrate, said facing having an acoustic resistance ratio that when superimposed upon said face of said substrate, a laminate is formed having an acoustic resistance ratio that approximates or equals the optimized value of the acoustic resistance ratio for said substrate.

9. The laminate of claim 8, wherein: said facing is secured to said substrate.

10. The laminate of claim 8, wherein: said facing is adhered to said face of said substrate.

11. The laminate of claim 8, wherein: said substrate is comprised of a material selected from the group of glass fibers, thermoplastic polymeric fibers, thermosetting polymeric fibers, cotton fibers, milkweed fibers, carbonaceous fibers, carbonized fibers, graphitized fibers and a polymeric foam.

12. A laminate having optimized sound absorbing characteristics comprising:
   a) a porous insulation substrate having an air flow resistance less than that required to produce an optimum sound absorbing characteristic for said substrate; and
   b) a thin, semi-porous facing superimposed upon a face of said substrate, said facing having an acoustic resistance ratio that approximates or equals to the difference between the acoustic resistance ratio of said substrate and the optimized value of the acoustic resistance ratio for said substrate.

13. The laminate of claim 12, wherein: said facing is secured to said substrate.

14. The laminate of claim 12, wherein: said facing is adhered to said face of said substrate.

15. The laminate of claim 12, wherein: said substrate is comprised of a material selected from the group of glass fibers, thermoplastic polymeric fibers, thermosetting polymeric fibers, cotton fibers, milkweed fibers, carbonaceous fibers, carbonized fibers, graphitized fibers and a polymeric foam.

* * * * *